July 22, 1930.
C. L. WHITE
1,771,280
BRAKE BAND SUPPORT
Filed May 31, 1927
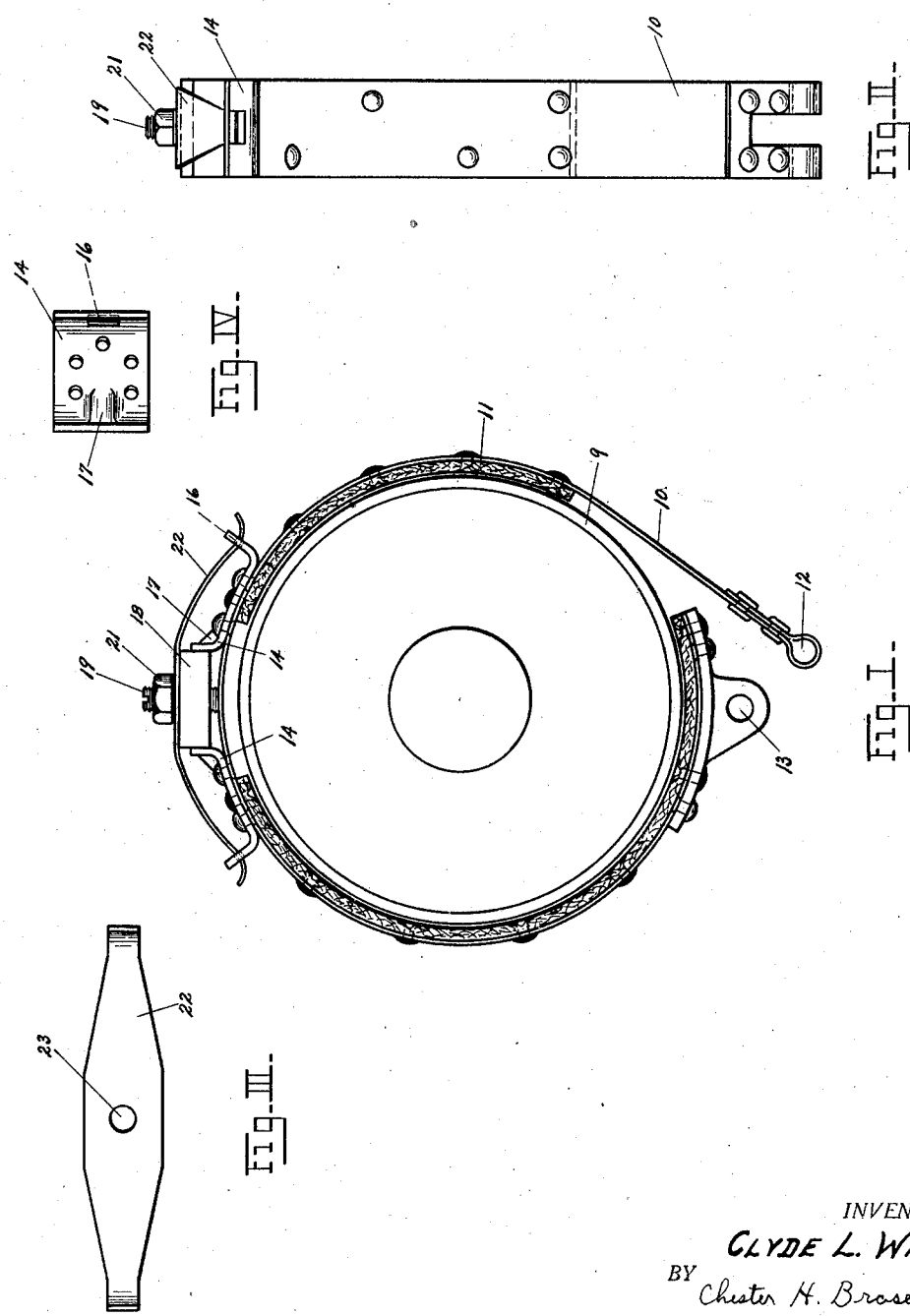
INVENTOR.
CLYDE L. WHITE.
BY Chester H. Braselton
ATTORNEY.

Patented July 22, 1930

1,771,280

UNITED STATES PATENT OFFICE

CLYDE L. WHITE, OF TOLEDO, OHIO, ASSIGNOR TO THE WILLYS-OVERLAND COMPANY, OF TOLEDO, OHIO, A CORPORATION OF OHIO

BRAKE-BAND SUPPORT

Application filed May 31, 1927. Serial No. 195,235.

My invention relates to brake mechanisms for automobiles and it has particular relation to transmission brake mountings.

One of the objects of the invention is to provide a brake mounting which will maintain the band in a position apart from the drum while the brake is released, and also to provide a construction in which the brake band is positively maintained in aligned relation with respect to the drum.

Another object of the invention is to provide a simplified brake mounting which may be constructed at a reduced cost and may be repaired with fewer operations than is possible with brakes of present day design.

It is a further object of this invention to provide a transmission brake which, without sacrificing efficacy, may be constructed more compactly than brake mountings now employed.

A further object of this invention is to provide a brake mounting having a single resilient means for withdrawing the band from engagement with the drum while released and having a more extended effective sphere of operation than is possible by other single spring brake releasing mechanism.

To attain the aforementioned objects, an embodiment of the present invention may include a brake drum and band of conventional design which are slidably associated with guiding means that are adapted to withstand torsional forces incident to the braking action. A leaf spring member of arcuate contour disposed adjacent the band is resiliently supported near its mid-portion by a suitable supporting member, and is secured to the band at spaced points. The spring serves to prevent the brake band from riding or dragging on the drum while the brake is in a released position.

Additional objects of my invention and a more comprehensive understanding of its principles may be had by referring to the drawings, in which Figure I is an elevational view of a brake mounting.

Fig. II is an end view of the elements illustrated in Fig. I.

Fig. III is a plan view of the spring member, and

Fig. IV is a plan view of one of the guiding or restricting elements.

The brake combination includes a drum 9 surrounded by a metallic strap 10 to which there is riveted a brake lining 11 of suitable texture and which is provided at each end with an aperture 12 and 13 adapted to be secured to a brake arm (not shown), preferably of the so-called floating pivot design. At a point removed from the extremities of the strap a pair of U-shaped guide elements 14 are rigidly secured. Each of the guide members is riveted at its base portion to the strap. The outer up-turned ends are each provided with a slot 16 whereas the adjacent up-turned ends are reinforced by means of an indenture 17 and serve as guides, that slidably engage a rectangular member 18 which is rigidly secured to a suitable adjoining member, such for example, as the transmission, (not shown).

The member 18 is provided with a tapped aperture wherein a set screw 19 having a lock nut 21 is fitted. The position of the screw defines one limit of movement of the band which is abutted thereagainst. A leaf spring 22 having upturned ends which fit in the slots 16 of the guide members and having an aperture 23 in its mid-portion that fits over the projected portion of the set screw, is maintained in position by the lock nut.

When the band is released, the spring member which has an extended sphere of influence by reason of spaced points of engagement with the band, raises the same radially causing a sliding movment between the guide members 14 and the rectangular member 18. At the same time the band will have a tendency to be spread outwardly by reason of the reacting forces of the spring.

It will be noted that the present invention includes a simplified, inexpensive brake mounting construction in which the movement of the band is restricted and guided, and in which the general operation is improved. It will further be noted that the construction obviates the necessity of a coil spring and ancillary structural elements, and affords a compactness such as is demanded in present day automobile design.

Although there is illustrated but a single embodiment of the invention, the principles underlying the same are not so limited, but as will be apparent to those skilled in the art, may be extended to include other modifications without departing from its scope, wherefore I desire that it be limited only as indicated in the appended claims.

I claim:

1. The combination of a brake drum, a brake band adapted to engage the outer surface thereof, means restricting one portion of the band to movement radially of the drum, an elongated leaf spring secured to the restricting means and the brake drum for raising the band free of the drum, and said spring being positioned substantially parallel to the brake band.

2. The combination of a brake drum, a brake band adapted to engage the outer surface thereof, means restricting one portion of the band to movement radially of the drum, an elongated resilient member secured intermediate its extremities to the restricting means and joined adjacent its extremities to the band, said resilient means being adapted to raise the band free of the drum.

3. The combination of a brake drum, a band adapted to engage the outer surface thereof, radially projected spaced members rigidly secured to the outer surface of the band, supporting means slidably disposed between the projected members, and an elongated resilient member secured intermediate its extremities to the supporting means, and joined adjacent its extremities to the band whereby it raises the band free of the drum.

4. The combination of a brake drum, a band adapted to engage the outer surface thereof, radially projected spaced members rigidly secured to the outer surface of the band, a band supporting member slidably disposed between the projected members, means adjustably secured to the supporting member and projected therethrough adapted to engage the band and limit the movement thereof, and an elongated resilient member secured at its mid-portion to the supporting means and operatively disposed at its extremities with the band whereby it raises the band free of the drum.

5. The combination with a brake drum, of an encircling expansible brake band, a guiding support adapted to permit axial movement of said band, slotted members secured to said brake band at a plurality of points spaced from said support and a unitary resilient member secured to said support and slidably engaging the band within said slots, whereby said brake band is confined to a single plane of movement upon said support.

In testimony whereof I affix my signature.

CLYDE L. WHITE.